I. A. SHANK.
LOCKING DEVICE FOR TEMPER SCREW SWIVELS.
APPLICATION FILED JULY 2, 1919.
1,377,287.
Patented May 10, 1921.
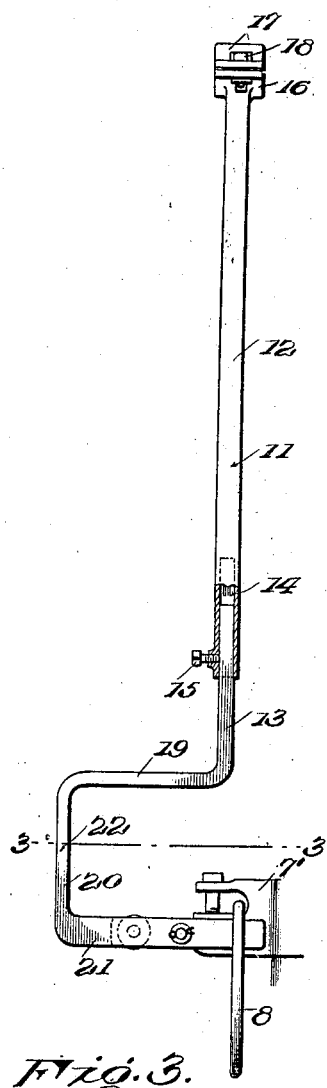
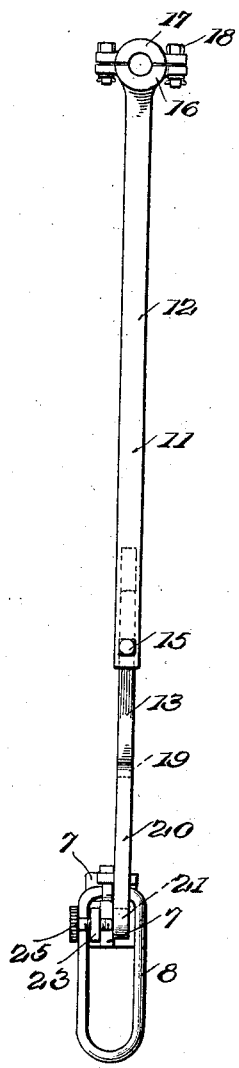
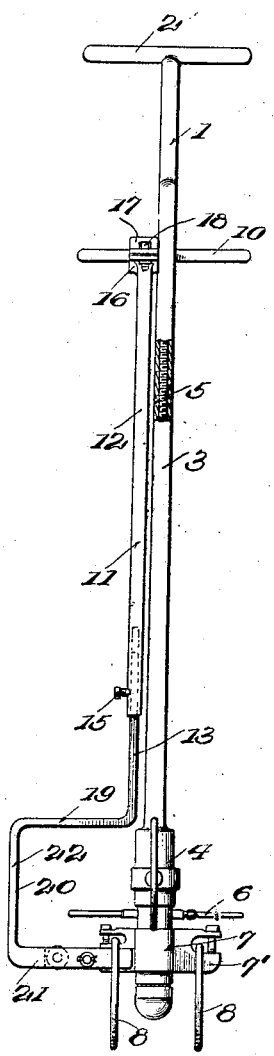
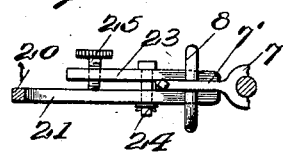
Inventor
I. A. Shank.
by Lacey & Lacey,
his Attorneys.

UNITED STATES PATENT OFFICE.

IRL A. SHANK, OF FLORENCE, COLORADO.

LOCKING DEVICE FOR TEMPER-SCREW SWIVELS.

1,377,287.  Specification of Letters Patent.  Patented May 10, 1921.

Application filed July 2, 1919. Serial No. 308,277.

*To all whom it may concern:*

Be it known that I, IRL A. SHANK, a citizen of the United States, residing at Florence, in the county of Fremont and State of Colorado, have invented certain new and useful Improvements in Locking Devices for Temper-Screw Swivels, of which the following is a specification.

This invention relates to improvements in devices for locking the swivels of the temper screws of drill rigs and has as its primary object to provide a device for this purpose capable of being readily applied to any of the ordinary types of temper screws and adapted to effectually prevent the twisting of the swivel and the cable and thus eliminating the danger, noise, and inconvenience attending the use of temper screws provided with swivels which are free to turn. Likewise the invention has as its object to obviate the employment of the usual "jockey stick" and other extemporaneous devices which have heretofore been employed more or less unsatisfactorily to prevent the swivel from turning.

Another object of the invention is to provide a device for the purpose stated which may be adjusted so as to adapt it to be applied to temper screw rigs having temper screws of different lengths.

A further object of the invention is to so construct the device that it will not in any way interfere with the turning of the temper screw handle.

In the accompanying drawings:

Figure 1 is a view partly in side elevation and partly in section illustrating the device embodying the present invention;

Fig. 2 is another view in elevation of the device;

Fig. 3 is a horizontal sectional view taken substantially on the line 3—3 of Fig. 1 looking in a downward direction;

Fig. 4 is a view similar to Fig. 1 illustrating the application of the device to a temper screw rig.

In the drawings the numeral 1 indicates the frame of the temper screw rig which frame is provided at its upper end with the usual cross head 2 for connection with the walking beam of the drilling rig. The frame 1 also includes the usual reins 3 and is provided at its lower end with the usual threaded bearing 4 through which the temper screw 5 is adjustably fitted, the hand bar for adjusting the said screw being indicated by the numeral 6 and the screw being provided at its lower end with the usual swivel 7 having the outstanding wings 7' to which are connected the links 8 for supporting the cable not shown. The numeral 10 indicates the usual elevator head carried at the upper end of the temper screw and extending between the reins 3.

The device embodying the present invention is intended to be connected with the elevator head 10 and with the swivel 7 so as to hold the said swivel against turning or oscillation during the drilling operation and the said device includes a rigid shank indicated in general by the numeral 11 and comprising sections indicated one by the numeral 12 and the other by the numeral 13. The section 12 is tubular as indicated by the numeral 14 and the section 13 has its upper portion telescopically fitted within the said section 12, as clearly shown in Fig. 1 of the drawings, a set screw 15 being adjustably threaded through the lower end of the section 12 to bear against the section 13 whereby to hold the sections in positions of adjustment. Of course, due to the provision of this telescopic connection between the sections, the shank 11 may be shortened or lengthened as desired and in accordance with the length of the temper screw in connection with which it is to be employed. The section 12 of the shank is formed at its upper end with the fixed member 16 of a two-part clamp, the other or cap member of the clamp being indicated by the numeral 17 and the members being connected by suitable bolts 18. This clamp is designed to be fitted to one of the arms of the elevator head 10 in the manner shown in Fig. 4 of the drawings and to be securely clamped thereto by tightening the bolts 18.

The section 13, near its lower end, is bent laterally outwardly substantially at right angles as at 19, thence downwardly as at 20, and thence inwardly as at 21 parallel to its portion 19 so as to provide an offset or yoke indicated by the numeral 22, the purpose of which will be presently explained. The arm 21 of the yoke is flattened so as to constitute one member of a clamp for the swivel 7. The other member of the clamp comprises a plate 23 which is connected with the arm 21 by means of a bolt 24 which passes through the said plate and arm and which permits of slight fulcruming movement of the plate 23 with relation to the arm. In attaching the clamp to the swivel, the same is disposed with the end of the arm 21 and the corresponding end of the plate 23 lying at opposite sides of one of the wings 7' of the swivel in the manner clearly shown in Figs. 2 and 3 of the drawings. A clamping screw 25 is threaded through the other end of the plate and may be tightened to bear against the adjacent face of the arm 21 so as to bring the outer ends of the plate and arm together with a clamping action upon the said wing of the swivel. In this manner the lower end of the device may be readily clamped to the swivel of the temper screw and will effectually hold the swivel against turning movement during the drilling operation.

By reference to Fig. 4 of the drawings, which figure illustrates the device embodying the present invention applied to a temper screw rig, it will be observed that while the device provides a rigid and direct connection between the elevator head 10 and the swivel 7 so as to effectually hold the swivel against turning movement, the offset or yoke 22 in the section 13 of the shank of the device affords clearance for the handle bars 6 provided for adjusting the temper screw so that the presence of the device does not in any way interfere with the operation of this bar by the attendant during the drilling operation.

Having thus described the invention, what is claimed as new is:

The combination with a temper screw frame, a temper screw mounted therein, a swivel carried by the lower end of the temper screw and having lateral wings carrying cable supporting links, and an elevator head carried by the upper end of the temper screw and extending transversely through the temper screw frame, of a shank disposed parallel with and close to the temper screw frame and clamped at its upper end to the elevator head, a lateral yoke at the lower end of the shank having the extremity of its lower branch bearing against a wing of the swivel and disposed within the link carried by said wing, and a clamping bar mounted on said lower branch of the yoke and bearing against the opposite side of the swivel wing engaged by said branch and within the link carried by said wing to clamp the swivel and prevent turning of the same.

In testimony whereof I affix my signature

IRL A. SHANK. [L. S.]